(12) United States Patent
William

(10) Patent No.: US 8,972,853 B2
(45) Date of Patent: Mar. 3, 2015

(54) RENDERING DIGITAL REPORT ELEMENTS USING A LAYOUT OPTIMIZATION TOOL

(75) Inventor: John Alex William, Trichy (IN)

(73) Assignee: Business Objects Software Limited, Dublin (IE)

(*) Notice: Subject to any disclaimer, the term of this patent is extended or adjusted under 35 U.S.C. 154(b) by 280 days.

(21) Appl. No.: 13/445,945

(22) Filed: Apr. 13, 2012

(65) Prior Publication Data

US 2013/0275864 A1     Oct. 17, 2013

(51) Int. Cl.
     *G06F 17/22*      (2006.01)

(52) U.S. Cl.
     CPC ............ *G06F 17/2294* (2013.01); *G06F 17/22* (2013.01)
     USPC ........... 715/244; 715/243; 715/245; 715/246; 715/247; 715/248; 715/249; 715/250; 715/251; 715/252; 715/253

(58) Field of Classification Search
     USPC .................................................. 715/243–253
     See application file for complete search history.

(56) References Cited

U.S. PATENT DOCUMENTS

| | | | | |
|---|---|---|---|---|
| 5,621,876 A | * | 4/1997 | Odam et al. | 715/212 |
| 5,634,016 A | * | 5/1997 | Steadham et al. | 715/753 |
| 5,649,216 A | * | 7/1997 | Sieber | 715/234 |
| 5,835,378 A | * | 11/1998 | Scepanovic et al. | 700/121 |
| 5,835,916 A | * | 11/1998 | Inaki et al. | 715/212 |
| 5,893,127 A | * | 4/1999 | Tyan et al. | 715/209 |
| 6,088,708 A | * | 7/2000 | Burch et al. | 715/229 |
| 6,184,879 B1 | * | 2/2001 | Minemura et al. | 715/723 |
| 6,209,119 B1 | * | 3/2001 | Fukui | 716/104 |
| 6,313,848 B1 | * | 11/2001 | Hoag | 345/684 |
| 6,639,611 B1 | * | 10/2003 | Leduc | 715/764 |
| 6,826,727 B1 | * | 11/2004 | Mohr et al. | 715/235 |
| 6,948,132 B2 | * | 9/2005 | Bennett et al. | 715/760 |
| 7,139,766 B2 | | 11/2006 | Thomson et al. | |
| 7,177,488 B2 | * | 2/2007 | Berkner et al. | 382/298 |
| 7,219,309 B2 | * | 5/2007 | Kaasila et al. | 715/800 |
| 7,281,210 B2 | * | 10/2007 | Ohashi et al. | 715/247 |
| 7,574,652 B2 | * | 8/2009 | Lennon et al. | 715/248 |
| 7,580,560 B2 | * | 8/2009 | Bryll | 382/152 |
| 7,640,496 B1 | | 12/2009 | Chaulk et al. | |
| 7,716,257 B2 | | 5/2010 | Thomson et al. | |
| 7,770,100 B2 | * | 8/2010 | Chamberlain et al. | 715/217 |
| 8,312,367 B2 | * | 11/2012 | Foster | 715/227 |
| 8,489,984 B1 | * | 7/2013 | Violet et al. | 715/243 |
| 2004/0051893 A1 | * | 3/2004 | Yoshida | 358/1.11 |
| 2004/0163047 A1 | | 8/2004 | Nagahara et al. | |

(Continued)

*Primary Examiner* — Andrew Dyer

(57) ABSTRACT

Various embodiments of systems and methods for automatically generating a layout plan are described herein. The method involves invoking original layout information for digital report elements rendered on an original layout region. The optimized layout plan for rendering the digital report elements on a target layout region is generated by: classifying the digital report elements into multiple arrays of digital report elements, deriving origin values for the digital report elements as a quotient of original dimensions of the digital report elements in the corresponding array, determining dimension quotient for the digital report elements based on the derived origin values for the digital report elements in the corresponding array, and determining target layout values as a function of the derived origin values and dimension quotient. The digital report elements are rendered on the target layout region based on the optimized layout plan defined by the target layout values.

16 Claims, 8 Drawing Sheets

(56) References Cited

U.S. PATENT DOCUMENTS

| | | |
|---|---|---|
| 2004/0177323 A1 | 9/2004 | Kaasila et al. |
| 2004/0216043 A1* | 10/2004 | Roudot ............................ 715/517 |
| 2005/0253874 A1* | 11/2005 | Lal et al. ......................... 345/661 |
| 2006/0004718 A1* | 1/2006 | McCully et al. .................. 707/3 |
| 2006/0005112 A1* | 1/2006 | Lilly et al. ....................... 715/500 |
| 2008/0284738 A1* | 11/2008 | Hovden et al. ................. 345/173 |
| 2011/0055258 A1* | 3/2011 | Racic .............................. 707/769 |
| 2011/0276868 A1* | 11/2011 | Hoke et al. ..................... 715/217 |

* cited by examiner

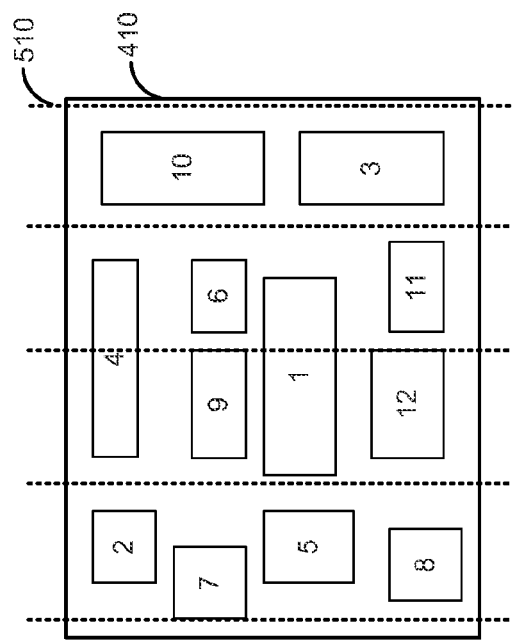
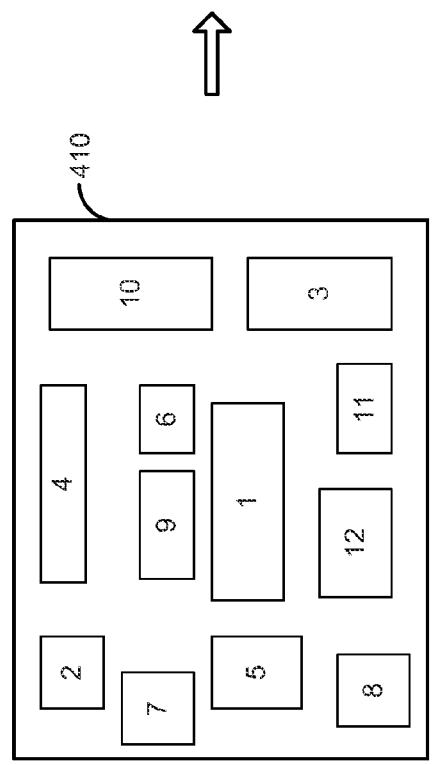
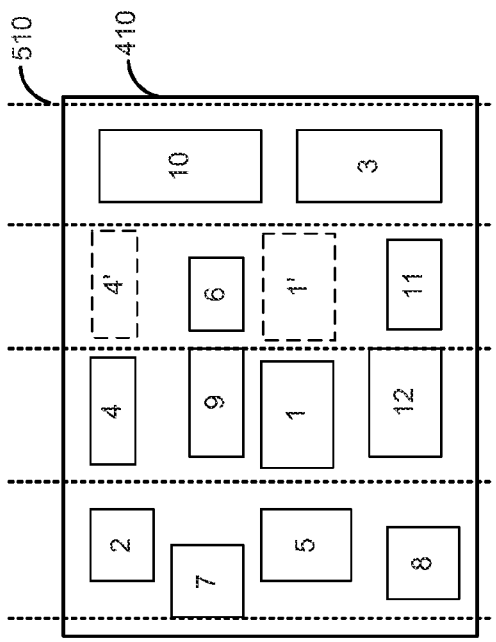

RENDERING DIGITAL REPORT ELEMENTS USING A LAYOUT OPTIMIZATION TOOL

FIELD

The field relates generally to visualizing reports in digital content reporting systems, and more specifically, the field relates to automatic generation of an optimized layout plan using a layout optimization tool.

BACKGROUND

Digital content reporting systems provide mechanisms for graphically presenting information to a user of the computer system. There are numerous conventional techniques that a reporting application can utilize to generate or construct information to be presented within a graphical user interface (GUI). Visual reports are an effective way to present data for learning and analysis. Reporting tools obtain data from data sources and provide the obtained data as visual report elements of a visual report. Examples of visual report elements include charts, graphs, plots, schemes, maps, or tables. Typically, the visual report elements in the visual report are dispersed arbitrarily on the layout region of the visual report. In order to sort the visual report elements, a user has to manually move the visual report elements using a user interface. In certain scenarios, the visual report may need to be presented on the GUIs of other devices having dissimilar display properties. For example, the other devices may have a smaller display area than the original GUI causing the report elements to skew or overlap with each other. In certain other scenarios, Business Intelligent reports have a dynamic layout, making it impossible to maintain a constant arrangement of report elements whenever the report elements are modified. For example, upon performing certain actions on the report (e.g, Refresh, Filter, Drill, etc.), the report elements may be resized, added, removed, or relocated in the layout region requiring a user to re-arrange the report elements each time.

SUMMARY

Various embodiments of systems and methods for automatically generating a layout plan using a layout optimization tool are described herein. In one aspect, a method for automatically generating a target layout plan using a layout optimization tool involves invoking original layout information for digital report elements rendered on an original layout region. In an aspect, an optimized layout plan for rendering the digital report elements on the target layout region is generated by: determining an order of the digital report elements using the received original layout information, classifying the digital report elements into multiple arrays of digital report elements, deriving origin values for the digital report elements as a quotient of original dimensions of the digital report elements in the corresponding array, determining dimension quotient for the digital report elements based on the derived origin values for the digital report elements in the corresponding array, and determining target layout values as a function of the derived origin values and dimension quotient. Further, the method involves arranging the digital report elements on the target layout region based on the optimized layout plan defined by the target layout values.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

FIGS. 4 to 8 illustrate an exemplary layout region through the various steps of generating an optimized layout plan, according to one embodiment.

DETAILED DESCRIPTION

Embodiments of techniques for automatically generating an optimized layout plan using a layout optimization tool are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
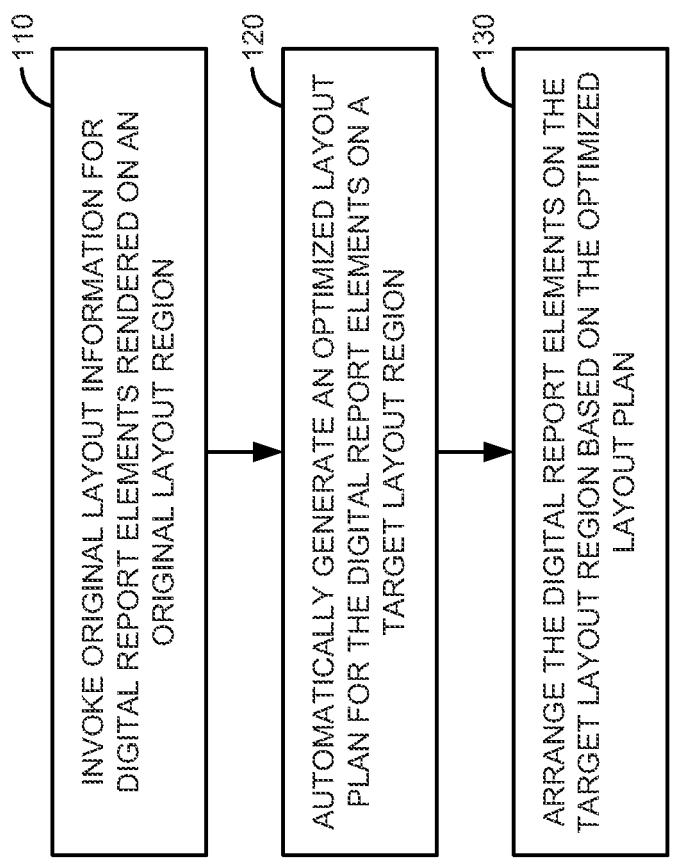
FIG. 1 is a flow diagram illustrating a method of arranging digital report elements on a target layout region using a layout optimization tool, according to one embodiment.

FIG. 1 illustrates a flow diagram of a method 100 for automatically generating an optimized layout plan using a layout optimization tool, according to an embodiment. The method 100, implemented by a computer or any other electronic device having processing capabilities, includes at least the following process illustrated with reference to process blocks 110 to 130. In an aspect, at process block 110, original layout information relating to digital report elements, that if invoked would be rendered on an original layout region, is presented. The original layout information includes data indicative of the location of report elements such as coordinate values and dimension values of the digital report elements that are originally rendered on the original layout region. The term "original layout region" as used herein refers to a display area of a graphical interface on which the digital report elements are originally rendered. The digital report elements as originally rendered may be arbitrarily distributed on the original layout region. Digital report elements are visual representations of information or data, capable of being generated and rendered on a graphical or display interface by a computer. Examples of digital report elements include, but are not limited to, tables, charts, graphs, plots, icons, and any other graphical representations.

At process block 120, an optimized layout plan for laying out the digital report elements on a target layout region is automatically generated. The term "target layout region" as used herein refers to a graphical interface onto which the digital report elements from the original layout region are re-laid. The optimized layout plan is an optimal scheme of arranging the digital report elements on the target layout region. For example, the optimized layout plan provides an arrangement of the digital report elements in which excess space between the report elements are removed and the digital report elements are scaled and aligned to fit within a target layout region. In an aspect, the original layout region is associated with a device external to the device having the target layout region. In another aspect, the original layout region and the target layout region are associated with one and the same device. In the latter, the original layout region maybe a landscape type layout and the target layout region may be a portrait type layout region, for example.

At process block 130, the digital report elements are re-laid on the target layout region according to the optimized layout plan. In an embodiment, re-laying the digital report elements on the target layout region includes re-sizing and/or re-positioning one or more digital report elements according to the optimized layout plan prior to rendering on the target layout region. The optimized layout plan is defined by target layout values such as target dimensions and target coordinate values for the digital report elements.

Figure 2:
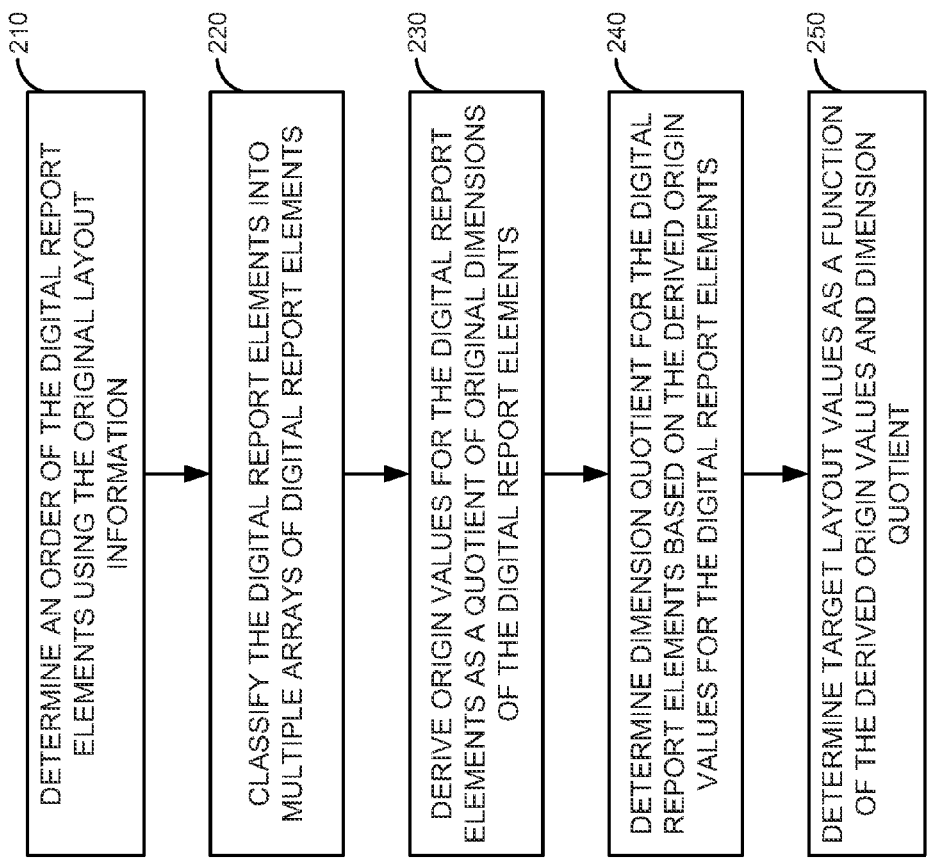
FIG. 2 is a flow diagram illustrating a method for automatically generating an optimized layout plan using a layout optimization tool, according to one embodiment.

In an embodiment, the target layout values may be derived in accordance with the method described with reference to FIG. 2. Herein, the coordinate system is Cartesian and left-handed, i.e., x-axis is horizontal and positive is right, y-axis is vertical and positive is down. Unless otherwise specified a report element's location is closest to the origin of coordinate system, e.g., upper left corner. At process block 210, an order of the digital report elements is determined using the original layout information. In an aspect, the order of occurrence of the digital report elements is determined using the coordinate values of each of the digital report elements. Based on the co-ordinate values, the order of occurrence of the digital report elements along a first coordinate axis is determined. For example, the order of occurrence of the digital report elements as rendered on the original layout region, along x-axis may be determined using the "x" co-ordinate values of each of the digital report elements. In an example, for a set of digital report elements labeled A-L, the co-ordinate (x,y) values as provided in the original layout information are as follows, denoted as element_name(x_position, y_position):

A(20, 32), B(10,10), C(43, 30), D(22, 10), E(17, 32), F(30, 21), G(5, 20), H(7, 42), I(23, 21), J(42, 10), K(31, 40), L(25, 41)

Using the "x" co-ordinate values, the digital report elements are ordered according to the order of occurrence of the digital report elements along the x-axis. Accordingly, in the given example, the order of the digital report elements along the x-axis, denoted as element_name(x_position), is determined as:

G(5), H(7), B(10), E(17), A(20), D(22), I(23), L(25), F(30), K(31), J(42), C(43).

Upon determining the order of occurrence of the digital report elements along at least one co-ordinate axis, the method proceeds to classifying the digital report elements into multiple arrays of digital report elements.

At process block 220, the ordered digital report elements are classified into one or more arrays of elements. In an aspect, as shown in process blocks 221-228 in FIG. 3, the digital report elements are traversed (221) along the order determined at process block 210 and split into several arrays. For example, the number of vertical arrays is determined as the maximum number of digital report elements occurring along the x-coordinate axis in any row. The digital report elements are looked up one by one starting with the second digital report element along the order and determined whether the left edge of a currently traversed digital report element is greater than a right edge of the previously traversed digital report element(s). The traversed digital report elements are aligned (223) in the same array as long as the left edge of the traversed digital report element is not greater than the right edge of the previously traversed digital report element(s).

On the other hand, if it is determined (224) that the left edge of a currently traversed digital report element is greater than the right edge of one or more previous digital report elements, a new array is formed (225) with the currently traversed digital report element and the subsequent digital report elements in the order. The new array is traversed and steps of process blocks 224-226 are iteratively performed with the newly formed array until no new arrays can be formed or until the end of the order of digital report elements is reached (228). The digital report elements may be split into either vertical arrays (columns of elements) or horizontal arrays (rows of elements). In the given example, the ordered digital report elements is split into multiple vertical arrays as follows:

| G | A | F | J |
|---|---|---|---|
| H | D | K | C |
| B | I |   |   |
| E | L |   |   |

A new array is formed with the digital report element A since the left edge of digital report element A is greater than the right edge of digital report elements G, H, B, and E. The left edge of the digital report element A is defined by its x-coordinate value while the right edge of the digital report elements G, H, B, and E are defined by a sum of the x-coordinate value and the width value for each of elements G, H, B, and E. In the given example, Left edge of A defined by x(A)=20, and
Right edge of G defined by (x(G)+w(G))=5+10=15,
Therefore, x(A)>(x(G)+w(G)).

Similarly, the arrays are formed with F and J respectively since, x(F)>(x(I)+w(I)) and x(J)>(x(F)+w(F)).

In an embodiment, upon classifying the digital report elements into multiple arrays, the digital report elements in each array are further ordered according to the order of occurrence of the digital report elements, along a second co-ordinate axis, as originally rendered on the original layout region. For example, the order of occurrence of the digital report elements in each of the multiple arrays, along y-axis is determined using the "y" co-ordinate values of each of the digital report elements as provided in the original layout information. In the given example, the co-ordinate values for digital report elements are given as follows, denoted as element_name(x_position, y_position), A(20, 32), B(10, 10), C(43, 30), D(22, 10), E(17, 32), F(30, 21), G(5, 20), H(7, 42), I(23, 21), J(42, 10), K(31, 40), L(25, 41)

Using the "y" co-ordinate values for the digital report elements in each array, the digital report elements in each vertical array is re-ordered as follows, denoted as element_name (y_position)

| | | |
|---|---|---|
| G(20) A(32) F(21) J(10) | | B(10) D(10) F(21) J(10) |
| H(42) D(10) K(40) C(30) | → | G(20) I(21) K(40) C(30) |
| B(10) I(21) | | E(32) A(32) |
| E(32) L(41) | | H(42) L(41) |

Subsequent to splitting the digital report elements into multiple arrays, at process block 230, origin (x, y) values are derived for the digital report elements in each array along at least the vertical (y) and horizontal (x) coordinate axes. Origin (x, y) values represent intermediate co-ordinate values for the digital report elements and are used to determine fractional target layout values for the optimized layout plan. In an aspect, the origin values are derived as a quotient of original dimensions of the digital report elements in the corresponding array. For example, the digital report element(s) in each array are traversed one-by-one and a magnitude of a cumulative dimension of the traversed digital report element(s) is divided by a magnitude of an aggregate dimension of the digital report elements in the corresponding array. In the given example, the dimension values for each of the digital report elements as provided in the original layout information are as follows, denoted element[width, height]:

| | | | |
|---|---|---|---|
| B[10, 10] | D[11, 7] | F[6, 11] | J[9, 25] |
| G[10, 12] | I[10, 11] | K[9, 8] | C[9, 26] |
| E[10, 15] | A[13, 12] | | |
| H[10, 11] | L[11, 10] | | |

Where, element[width, height] represents the width, and height of each digital report element.

Based on the height value for each digital report element in an array, the origin y value for each digital report element along the vertical axis (y-axis) is calculated. For example, considering the vertical array formed of elements B, G, E, and H, the origin y values for B, G, E, H are calculated using the following equations, $$B(y_1)=R/(R+h_b+h_g+h_e+h_h)$$

$$G(y_2)=(R+h_b)/(R+h_b+h_g+h_e+h_h)$$

$$E(y_3)=(R+h_b+h_g)/(R+h_b+h_g+h_e+h_h)$$

$$H(y_4)=(R+h_b+h_g+h_e)/(R+h_b+h_g+h_e+h_h)$$

Where,

R is a reference margin value, where R is a variable that can be pre-defined. In the given example, R=0.

$y_1, y_2 \ldots y_4$ represent the origin y of each element in the array formed by B, G, E, H respectively.

Applying the original height values of the digital report elements to the above equations, produces origin y values for digital report elements, B, G, E, H as follows:

$$B(y_1)=0/(0+10+12+15+11)\rightarrow 0/48=0$$

$$G(y_2)=(0+10)/(0+10+12+15+11)\rightarrow 10/48=0.2$$

$$E(y_3)=(0+10+12)/(0+10+12+15+11)\rightarrow 22/48=0.4$$

$$H(y_4)=(0+10+12+15)/(0+10+12+15+11)\rightarrow 37/48=0.7$$

Similarly, the origin y values are derived for the rest of the multiple arrays. Further, the origin x values for the digital report elements along the horizontal axis (x-axis) are derived based on the width values for each digital report element in each array. In an aspect, the origin x values for the digital report elements in an array are determined by dividing a magnitude of a cumulative dimension of maximum width values of digital report element(s) in each array that is traversed by a magnitude of an aggregate of the maximum width of the digital report elements in each of the multiple arrays. In the given example, considering the vertical array formed of elements B, G, E, and H, the origin x values for B, G, E, H are calculated using the following equations, denoted as element_name(x_position)

$$\text{Origin}(x)=B(x_1),G(x_2),E(x_3),H(x_4)=R/[\max(w_b,w_g,w_e,w_h)+\max(w_d,w_i,w_a,w_l)+\max(w_f,w_k)+\max(w_j,w_c)]$$

$$B(x_1),G(x_2),E(x_3),H(x_4)=0/[\max(10,10,10,10)+\max(11,10,13,11)+\max(6,9)+\max(9,9)]$$

$$B(x_1),G(x_2),E(x_3),H(x_4)=0/(10+13+9+9)$$

$$B(x_1)=G(x_2)=E(x_3)=H(x_4)=0$$

Where,

R=0 is a reference origin value $\max(w_b, w_g, w_e, w_g)$ represents the maximum value of the original widths $w_b, w_g, w_e, w_h$ for digital report elements B, G, E, H in the array $x_1, x_2, x_3, x_4$ represent the origin x value for each element in the array formed by B, G, E, H respectively.

Similarly, the origin (x) values for the rest of the vertical array are determined as follows:

$$D(x_1),I(x_2),A(x_3),L(x_4)=R+\max(w_b,w_g,w_e,w_h)/[\max(w_b,w_g,w_e,w_h)+\max(w_d,w_i,w_a,w_l)+\max(w_f,w_k)+\max(w_j,w_c)]$$

$$D(x_1),I(x_2),A(x_3),L(x_4)=0+\max(10,10,10,10)/[\max(10,10,10,10)+\max(11,10,13,11)+\max(6,9)+\max(9,9)]$$

$$D(x_1),I(x_2),A(x_3),L(x_4)=(0+10)/(10+13+9+9)$$

$$D(x_1)=I(x_2)=A(x_3)=L(x_4)=0.24$$

$$F(x_1),K(x_2)=R+\max(w_b,w_g,w_e,w_h)\max(w_d,w_i,w_a,w_l)/[\max(w_b,w_g,w_e,w_h)+\max(w_d,w_i,w_a,w_l)+\max(w_f,w_k)+\max(w_j,w_c)]$$

$$F(x_1),K(x_2)=0+\max(10,10,10,10)+\max(11,10,13,11)/[\max(10,10,10,10)+\max(11,10,13,11)+\max(6,9)+\max(9,9)]$$

$$F(x_1),K(x_2)=(0+10+13)/(10+13+9+9)$$

$$F(x_1)=K(x_2)=0.56$$

$$J(x_1),C(x_2)=R+\max(w_b,w_g,w_e,w_h)+\max(w_d,w_i,w_a,w_l)+\max(w_f,w_k)/[\max(w_b,w_g,w_e,w_h)+\max(w_d,w_i,w_a,w_l)+\max(w_f,w_k)+\max(w_j,w_c)]$$

$$J(x_1),C(x_2)=0+\max(10,10,10,10)+\max(11,10,13,11)+\max(6,9)/[\max(10,10,10,10)+\max(11,10,13,11)+\max(6,9)+\max(9,9)]$$

$$J(x_1),C(x_2)=(0+10+13+9)/(10+13+9+9)$$

$$J(x_1)=C(x_2)=0.78$$

The origin values derived as above are used to determine dimension quotient for the digital report elements in each array. The dimension quotient represents fractional values of the dimensions (height, width) of the original digital report elements, used for scaling the dimensions of the digital report elements according to the dimensions of the target layout region. In an aspect, at process block 240, the dimension quotient for the digital report elements in the multiple arrays is determined by traversing the digital report element(s) sequentially along the array and determining a dimension quotient for a particular digital report element by subtracting an origin value of the particular digital report element from the origin value of a succeeding digital report element in the array. In the given example, the origin values for the digital report elements derived at in process block 230 are as follows:

| B(0, 0) | D(0.24, 0) | F(0.56, 0) | J(0.78, 0) |
|---|---|---|---|
| G(0, 0.2) | I(0.24, 0.1) | K(0.56, 0.5) | C(0.78, 0.5) |
| E(0, 0.4) | A(0.24, 0.4) | | |
| H(0, 0.7) | L(0.24, 0.7) | | |

Using the origin values, the dimension quotient for the digital report elements are calculated as a difference of the origin values of consecutive digital report elements, along the direction of the co-ordinate axis. For example, considering the vertical array formed of elements B, G, E, and H, the dimension quotient for height is calculated as the difference in the origin y values between consecutive digital report elements in the vertical array, as follows:
The dimension quotient of the heights is then, $$B(hQ_1)=B(y_g-y_b) \rightarrow B(0.2-0)=0.2$$

$$G(hQ_2)=G(y_e-y_g) \rightarrow G(0.4-0.2)=0.2$$

$$E(hQ_3)=E(y_h-y_e) \rightarrow E(0.7-0.4)=0.3$$

$$H(hQ_4)=H(1-R-y_h) \rightarrow H(1-0-0.7)=0.3$$

Where R is a reference margin value, where R is a variable that can be pre-defined. In the given example, R=0.
Similarly, the dimension quotient of the heights is derived for the rest of the multiple vertical arrays.

Further, the dimension quotient for width is calculated as the difference in the origin x values between consecutive digital report elements in the horizontal array. For example, considering the horizontal array formed of elements B, D, F, and J, the dimension quotient for width is calculated as the difference in the origin x values between consecutive digital report elements in the horizontal array, as follows:

| B(0, 0) | D(0.24, 0) | F(0.56, 0) | J(0.78, 0) |
|---|---|---|---|

The dimension quotient of the widths is then, $$B(wQ_1)=B(x_d-X_b) \rightarrow B(0.24-0)=0.24$$

$$D(wQ_2)=D(x_f-x_d) \rightarrow D(0.56-0.24)=0.32$$

$$F(wQ_3)=F(x_j-x_1) \rightarrow D(0.78-0.56)=0.22$$

$$J(wQ_4)=J(1-x_j) \rightarrow J(1-0.78)=0.22$$

Similarly, the dimension quotient of the width values are derived for the rest of the horizontal arrays.
The origin values and the dimension quotient for the elements A-L are derived as follows, denoted as element_name(x_position, y_position) [width, height]:

| B(0, 0)[0.24, 0.2] | D(0.24, 0)[0.32, 0.1] | F(0.56, 0)[0.22, 0.5] | J(0.78, 0)[0.22, 0.5] |
|---|---|---|---|
| G(0, .2)[0.24, 0.2] | I(0.24, .1)[0.32, .3] | K(0.56, .5)[0.22, .5] | C(0.78, .5)[0.22, .5] |
| E(0, 0.4)[0.24, 0.3] | A(0.24, 0.4)[0.32, 0.3] | | |
| H(0, 0.7)[0.24, 0.3] | L(0.24, 0.7)[0.32, 0.3] | | |

At process block 250, target layout values are derived as a function of the derived origin values and dimension quotient. In an aspect, the target dimension values are derived as a product of the dimension quotient for each digital report element and the actual dimensions (W, H) of the target layout region. In an example, the actual dimensions W, H of the target layout region refer to the width and height dimensions of the target layout region limited by the physical display area of a target device. The target origin values are derived as a product of the derived origin values and the dimensions (W, H) of the target layout region. The derived target layout values define the target layout plan for optimally arranging the digital report elements on the target layout region. In an aspect, the target layout values may be calculated taking into account a pre-defined space value to be allotted between the digital report elements in the target layout. For example, a certain amount of pixel space may be predefined as a space value, such that the origin values are calculated factoring the pixels allotted for the space between the elements. The space value may be user defined or provided as a default setting.

In an embodiment, upon determining the target layout values for rendering the digital report elements on the target layout region, the target coordinate values and target dimension values are further analyzed to determine whether one or more digital report elements have overlapping edges with one or more other digital report elements. For example, the target co-ordinate values of a digital report element is compared with a sum of target co-ordinate value and dimension value for one other digital report element that is adjacent (or preceding) the digital report element, to determine whether an overlap occurs. If it is determined that an overlap occurs, then the digital report element is proportionately scaled down (cropped) or moved in the target layout region. Specifically, such correction ensures that the spanning elements do not overlap with other elements as rendered on the target layout region.

The digital report elements are then arranged on the target layout region based on the optimized layout plan. In an aspect, prior to rendering the digital report elements on the target layout region, the dimensions of the digital report elements are modified according to the target dimension values. Further, the co-ordinate position of the digital report elements are modified according to the target co-ordinate values.

In an embodiment, upon classifying the digital report elements into multiple arrays of digital report elements at process block 220, the method includes determining whether one or more digital report elements span between two or more of the multiple arrays of digital report elements. The multiple arrays can include horizontal arrays or vertical arrays. If a digital report element spans between two or more vertical arrays, a horizontal spanning value is calculated for the digital report element. If the digital report element spans between two or more horizontal arrays, a vertical spanning value is calculated for the digital report element. The digital report element is assigned to one of the two or more arrays and a proxy digital report element is created and assigned to the other arrays of the two or more arrays based on the horizontal or vertical spanning value. The proxy digital report element is temporarily treated as any other digital report element in the array and the steps of the method from process blocks 230-250 are applied to the proxy digital report element in determining the target layout values. Upon identifying one or more spanning digital report elements, the multiple arrays may be further split if the left edge of at least one spanning digital report element is greater than the right edge of any other element in the corresponding array. Once the target layout values are calculated for the proxy digital report element, the digital report elements that were originally spanning across multiple arrays, is spanned on the target layout region according to the target dimensions (height, width) calculated for the proxy digital report elements.

Further, in an embodiment, the original layout information may include one or more layout constraints associated with the digital report elements. For example, the layout constraints may define a maximum/minimum height, minimum/maximum width, fixed edge, fixed position, etc. The optimized layout plan is generated considering the layout constraints. For example, when the layout constraint for a particular digital report element defines a maximum height value which is less than the derived target height value, then the digital report element is scaled to the maximum height value defined by the layout constraint. In such a scenario, the digital report element is rendered on the target layout region with the height value as the maximum height value. In another example, if the digital report element is a Table, and the layout constraint defines a maximum width value, then the Table may be rendered on the target layout region with a width scaled to the maximum width value. However, the Table may be rendered scrollable from at least one edge, such that the contents of the table can be viewed by scrolling the Table.

Figure 3:
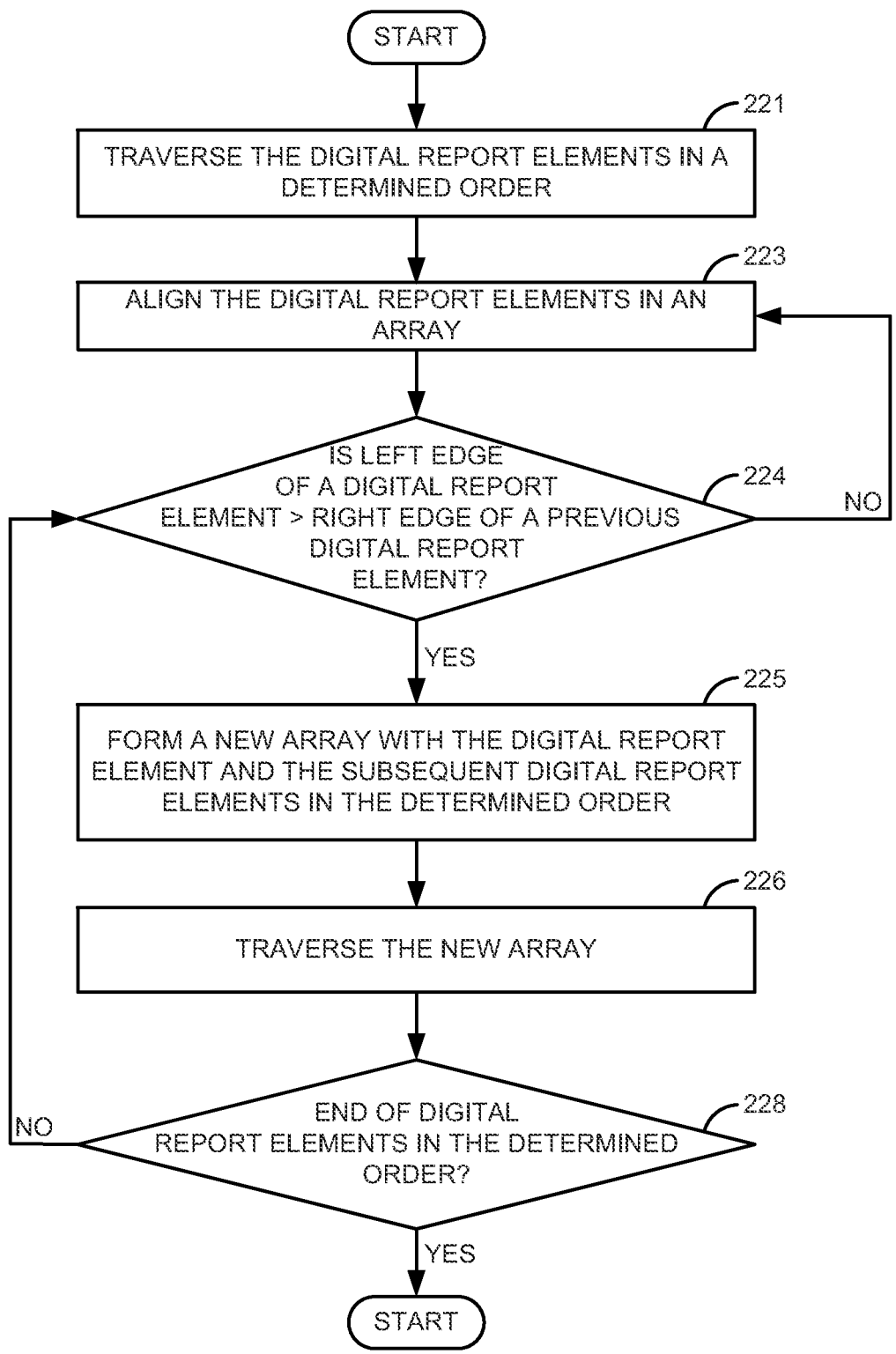
FIG. 3 is a flow diagram illustrating a method for classifying the digital report elements into multiple arrays of digital report elements, according to one embodiment.

FIGS. 4 to 9 provide a visual representation of the optimized layout plan generation process described with reference to FIGS. 1 to 3. FIG. 4 illustrates an exemplary original layout region 410 having digital report elements rendered thereon. The dimension values and the co-ordinate values pertaining to the digital report elements numbered 1-12 constitute the original layout information. Using the original layout information, the digital report elements are ordered in a particular order defined by the order of occurrence of the digital report elements along a particular axis. For example, based on the "x" co-ordinate values of elements 1 to 12, the order of occurrence of the elements along the x-axis is determined as 7, 8, 2, 5, 1, 4, 9, 12, 6, 11, 10, and 3. Upon ordering the digital report elements, the digital report elements are classified into one or more arrays. As shown in FIG. 5, the digital report elements are classified into multiple vertical arrays 510. As mentioned above, the digital report elements are classified by determining whether the left edge of the digital report element is greater that a right edge of the previous digital report element(s).

In the given example, the digital report elements are traversed in the determined order starting with digital report element 7. The digital report elements 7, 8, 5, and 2 are aligned to form a first array since the left edge of the digital report elements 7, 8, 5, or 2 is found to be less than the right edge of any of the previous digital report elements. Upon traversing further, the digital report element 4 is found to have its left edge greater than the right edge of digital report elements 7, 8, 5, and 2. A new array is formed with the digital report element 4 followed by the digital report elements 9, 12, 6, 11, and 10. The digital report elements 9, 12, 6, 11, and 10 are aligned under digital report element 4 to form a second array, as long as one of 9, 12, 6, 11, and 10 has a left edge greater than the right edge of the elements in the array starting from 4. The above steps are iteratively performed with the newly formed array until no new arrays can be formed or until the end of the order of digital report elements is reached.

After the digital report elements are classified into vertical arrays, the digital report elements are ordered again within their respective vertical arrays. For example, the digital report elements 7, 8, 5, and 2 in the first array are ordered according to the order of occurrence of the digital report elements along the y-axis using the "y" co-ordinate values for 7, 8, 5, and 2. Similarly, the digital report elements within the second and subsequent arrays are ordered using the "y" co-ordinate values. Further, a horizontal spanning value is calculated for digital report elements 4 and 1 based on determining that the digital report elements 4 and 1 span across at least two vertical arrays. Based on the horizontal values for digital report elements 4 and 1, proxy digital report elements 4' and 1' are generated.

As shown in FIG. 6, the spanning digital report elements 4 and 1 are restricted to one (e.g., a first) vertical array and the proxy digital report elements 4' and 1' are rendered in the other vertical array that was spanned. The proxy digital report elements merely simulate the digital report elements and act as placeholders in the overall layout determination process.

Figure 9:
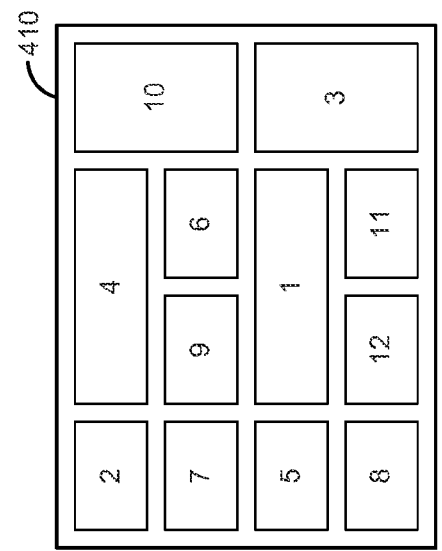
FIG. 9 illustrates an exemplary target layout region according the optimized layout plan, according to one embodiment.
Figure 7:
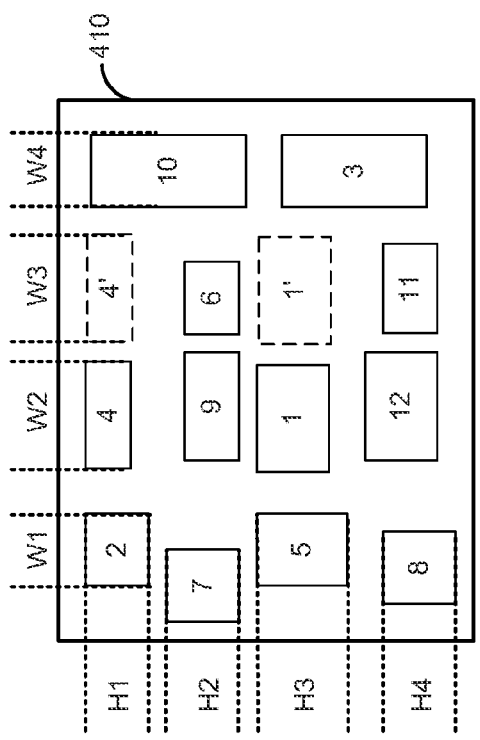
Figure 8:

As shown in FIG. 7, the origin values are derived for each of the digital report elements including the proxy digital report elements based on the dimension values (h, w) of the digital report elements. Further, using the origin values, the dimension quotient for the digital report elements are calculated as a difference of the origin values of consecutive digital report elements, along the direction of the co-ordinate axis. The target layout values are then derived as a function of the derived origin values and dimension quotient. The digital report elements are then resized and repositioned according to the target layout values as show in FIG. 8. The target layout values optimize the layout plan by removing unnecessary spaces and misaligned margins such that the digital report elements are rendered on a target layout region in an optimized manner as shown in FIG. 9. The digital report elements 4 and 1 may be rendered to span over a dimension defined by the corresponding values. For example, the digital report element 4 is laid on the target layout region with its width calculated as a sum of the widths of element 4 and 4' in FIG. 8.

Figure 11:
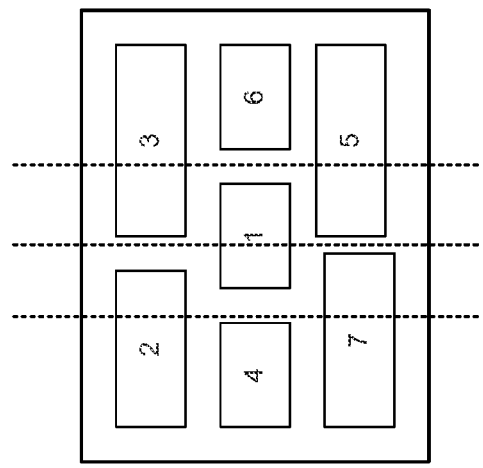
FIGS. 10 to 12 provide a visual representation of an embodiment in the optimized layout plan generation process, according to one embodiment.
Figure 12:
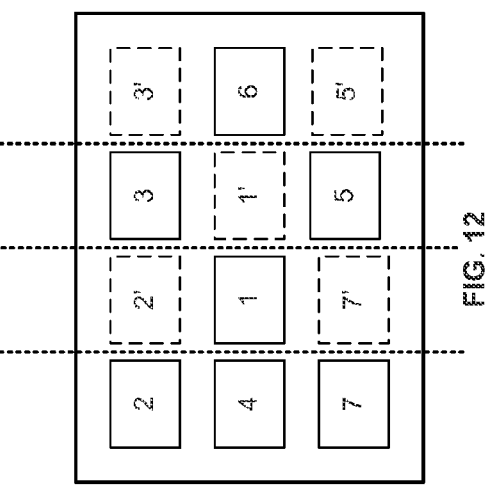
Figure 10:
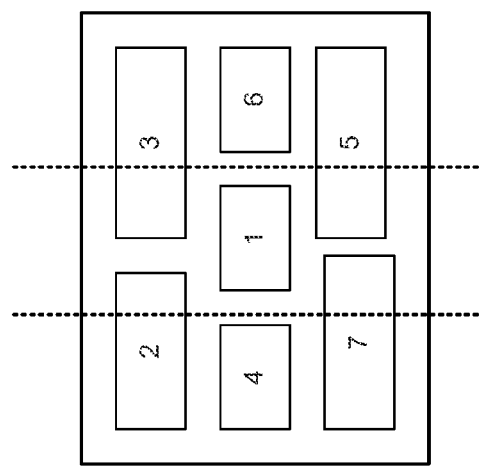

FIGS. 10 to 12 provide a visual representation of an embodiment in the optimized layout plan generation process. According to the embodiment, the digital report elements may be further split into additional arrays depending on the position of the spanning elements in an array. As shown in the example, the digital report elements 1-7 are split into 3 vertical arrays formed of sets of elements [2, 4, 7], [2', 3, 1, 7', 5], and [3', 6, 5']. Elements 2', 7', 3', and 5' represent spanning elements. For example, considering the second array formed of elements [2', 3, 1, 7', 5], a reference right edge (minR) is determined, where the minR is the minimum of a sum of "x" co-ordinate value and the width value of the spanned elements in the second array. The left edges of the digital report elements falling within the second array are compared with the minR value and if it is determined that one or more digital report element's left edge is greater than the minR value, a new array is formed with the one or more digital report elements. In the given example, referring to the second array, the five elements are split further into two arrays formed of elements [2', 1, 7'] and [3, 1', 5].

Figure 13:
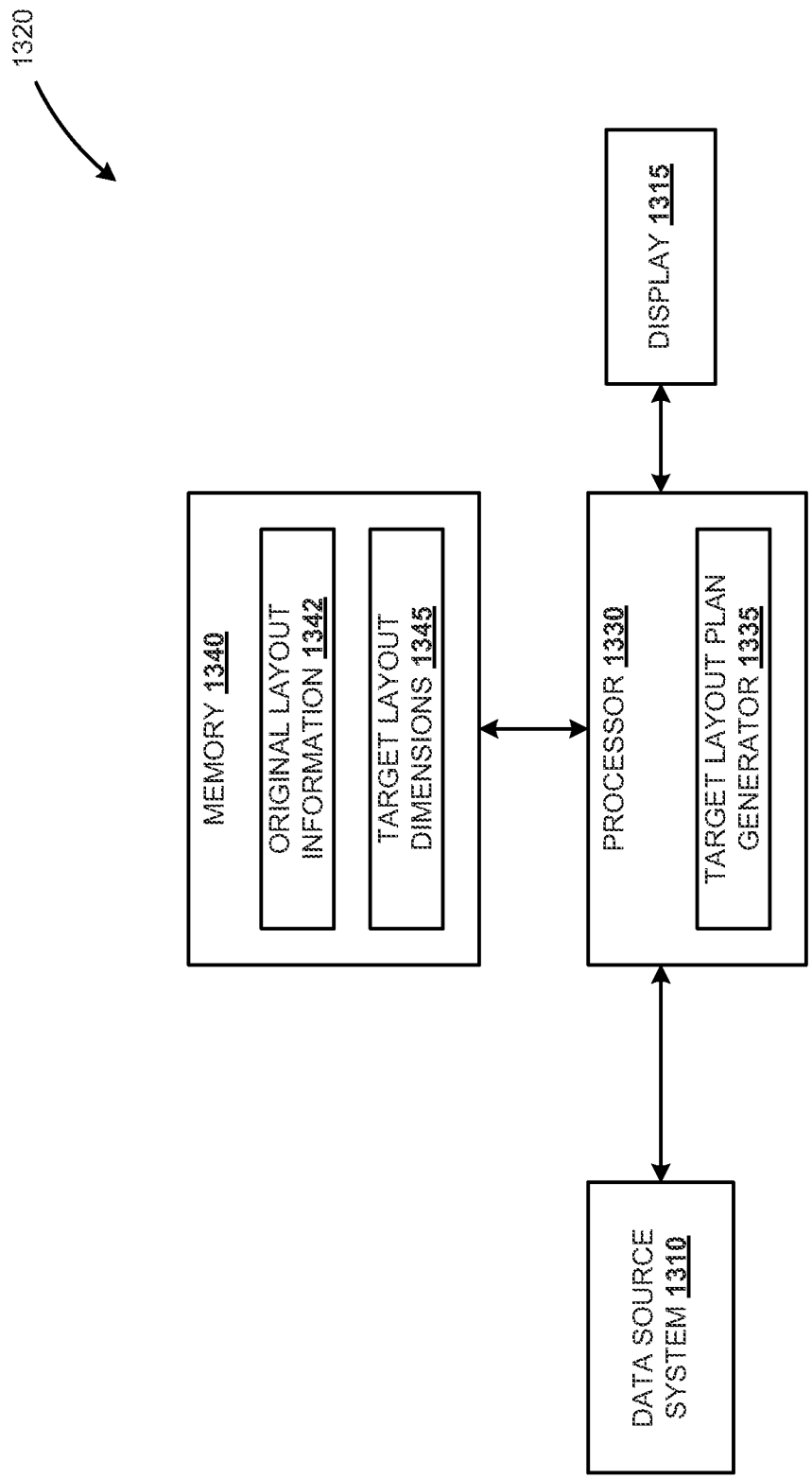
FIG. 13 is a block diagram of an exemplary system, according to one embodiment.

FIG. 13 is a block diagram of an exemplary system 1320 for automatically generating an optimized layout plan using a layout optimization tool, according to one embodiment. The system 1320 may be communicatively coupled to one or more data source systems 1310. Data source systems 1310 refer to sources of data that enable data storage and/or retrieval. For example, data source system 1310 may include databases, web applications, web server, a reporting tool, data server etc. Examples of databases include relational, transactional, hierarchical, multi-dimensional (e.g., OLAP), object oriented databases, and the like. Data source systems 1310 may also include a data source where the data is not tangibly stored or otherwise ephemeral such as data streams, broadcast data, and the like.

In an embodiment, the system 1320 includes a processor 1330 that executes software instructions or code comprising the layout optimization tool, stored on a computer readable storage medium, to perform the above-illustrated methods. The system 1320 includes a media reader to read the instructions from the computer readable storage medium and store the instructions in storage or in random access memory (RAM). For example, the computer readable storage medium includes executable instructions for performing operations including, but not limited to, invoking original layout information relating to digital report elements rendered on an original layout region, generating an optimized layout plan for the digital report elements and arranging the digital report elements on the target layout region based on the optimized layout plan. In an aspect, the original layout region is associated with a device external to the system 1320. Examples of the external device include handheld tablet device, laptop, personal computer, PDA, smart phones, etc. In another aspect, the original layout region and the target layout region are associated with the system 1320. In the latter, the original layout region maybe a landscape type layout and the target layout region may be a portrait type layout region.

According to an aspect, the memory 1340 holds the original layout information 1342 and target layout information 1345. The original layout information 1342 includes dimension values and co-ordinate values relating to digital report elements that are rendered on the original layout region. The target layout information refers to the dimension (e.g., height and width) values relating to the target layout region. The target layout region is a graphical user interface capable of displaying digital content. The dimensions of the target layout region refer to the dimensions of the graphical user interface. In an aspect, the dimension values are expressed in terms of pixel counts and the target layout values are derived in terms of pixel counts.

The processor may retrieve the original layout information directly from the data source system 1310 or the external device. The processor 1330 then processes the original layout information 1342 using the optimized layout plan generator 1335 in order to perform the steps of the process described with reference to FIGS. 1-3. The digital report elements are rendered on the target layout region of the display 1315 of the target device 1320 according to the optimized layout plan.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 14:
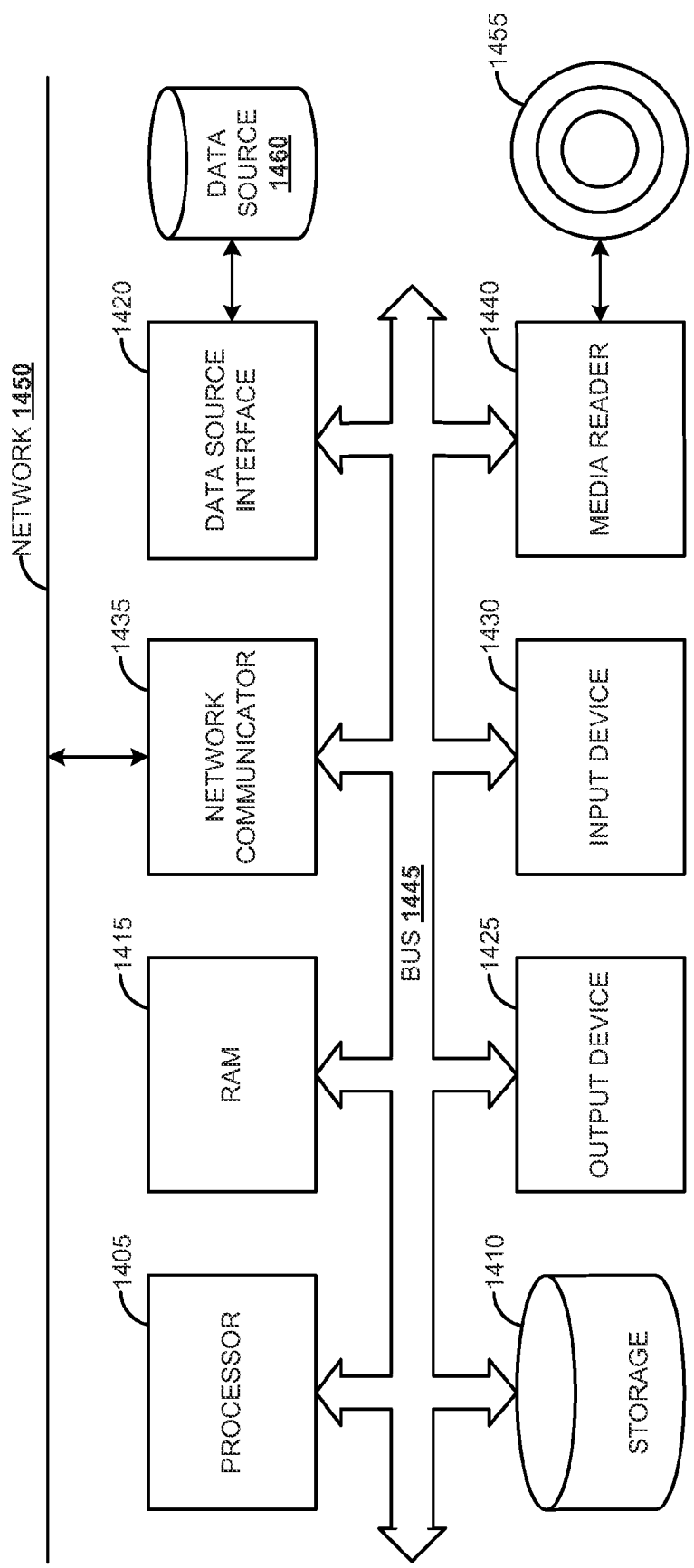
FIG. 14 is a block diagram of an exemplary computer system according to one embodiment.

FIG. 14 is a block diagram of an exemplary computer system 1400. The computer system 1400 includes a processor 1405 that executes software instructions or code stored on a computer readable storage medium 1455 to perform the above-illustrated methods of the invention. The computer system 1400 includes a media reader 1440 to read the instructions from the computer readable storage medium 1455 and store the instructions in storage 1410 or in random access memory (RAM) 1415. The storage 1410 provides a large space for keeping static data where at least some instructions could be stored for later execution. The stored instructions may be further compiled to generate other representations of the instructions and dynamically stored in the RAM 1415. The processor 1405 reads instructions from the RAM 1415 and performs actions as instructed. According to one embodiment of the invention, the computer system 1400 further includes an output device 1425 (e.g., a display) to provide at least some of the results of the execution as output including, but not limited to, visual information to users and an input device 1430 to provide a user or another device with means for entering data and/or otherwise interact with the computer system 1400. Each of these output devices 1425 and input devices 1430 could be joined by one or more additional peripherals to further expand the capabilities of the computer system 1400. A network communicator 1435 may be provided to connect the computer system 1400 to a network 1450 and in turn to other devices connected to the network 1450 including other clients, servers, data stores, and interfaces, for instance. The modules of the computer system 1400 are interconnected via a bus 1445. Computer system 1400 includes a data source interface 1420 to access data source 1460. The data source 1460 can be accessed via one or more abstraction layers implemented in hardware or software. For example, the data source 1460 may be accessed by network 1450. In some embodiments the data source 1460 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data-Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer-implemented method of arranging digital report elements on a target layout region, the method comprising:
    invoking original layout information for the digital report elements rendered on an original layout region, wherein the original layout information comprises coordinate values and original dimensions including width and height values of the digital report elements;
    automatically generating, by the computer, an optimized layout plan for rendering, the digital report elements on the target layout region comprising:
        determining an order of the digital report elements, along a first coordinate axis;
        classifying the digital report elements into multiple arrays based on the original layout information and the determined order;
        deriving origin values for the digital report elements in the multiple arrays based on the original dimensions of the digital report elements, wherein the origin values are derived along at least the first coordinate axis and the second coordinate axis, wherein deriving the origin values for the digital report elements along the first coordinate axis comprises:
            traversing at least one of the multiple arrays sequentially along the first coordinate axis; and
            dividing a sum of maximum of width values of the digital report elements in the at least one of the multiple arrays that are traversed by a sum of maximum of width values of the digital report elements in the multiple arrays;
        further wherein deriving the origin values for the digital report elements along the second coordinate axis comprises:
            traversing at least one of the digital report elements sequentially along each array of the multiple arrays; and
            dividing a sum of height values of the at least one of the digital report elements that are traversed in a corresponding array by a sum of height values of the digital report elements in the corresponding array;
        determining fractional values for scaling the original dimensions of the digital report elements in the multiple arrays based on the derived origin values, along the first coordinate axis and the second coordinate axis; and
        determining target layout values as a function of the derived origin values and the determined fractional values; and
    arranging the digital report elements on the target layout region based on the determined target layout values.

2. The method of claim 1, wherein classifying the digital report elements into the multiple arrays comprises:
    traversing the digital report elements in the determined order and aligning the digital report elements in an array as long as a left edge of a traversed digital report element is not greater than a right edge of at least one previously traversed digital report element;
    determining that the left edge of the traversed digital report element is greater than the right edge of the at least one previously traversed digital report element; and
    forming a new array with the traversed digital report element and subsequent digital report elements in the determined order.

3. The method of claim 1, wherein determining the order of the digital report elements using the coordinate values of the digital report elements comprises: determining an order of occurrence of the digital report elements, as rendered on the original layout region, along the first coordinate axis using the coordinate values of the digital report elements.

4. The method of claim 1, wherein determining the order of the digital report elements in each array of the multiple arrays comprises: determining an order of occurrence of the digital report elements in each array along the second coordinate axis using the coordinate values of the digital report elements.

5. The method of claim 1, further comprising:
    determining that at least one digital report element spans between at least two arrays of the multiple arrays; and
    assigning the at least one digital report element to one of the at least two arrays and creating a proxy digital report element for the rest of the at least two arrays based on a spanning value.

6. The method of claim 1, wherein determining fractional values for scaling the digital report elements in the multiple arrays comprises:
    traversing the digital report elements sequentially along each array of the multiple arrays; and
    determining fractional values for scaling a particular digital report element by subtracting the origin values of the particular digital report element from the origin value of a succeeding digital report element in the corresponding array.

7. The method of claim 1, wherein determining target layout values comprises:
    determining target dimensions of the digital report elements as a function of determined fractional values; and
    determining target origin values as a function of the derived origin values for the digital report elements.

8. The method of claim 1, wherein arranging the digital report elements on the target layout region based on the determined target layout values comprises modifying the original dimensions of the digital report elements according to the target layout values and rendering the modified digital report elements on the target layout region.

9. An article of manufacture, comprising:
    a non-transitory computer readable storage medium having instructions which when executed by a computer causes the computer to:
    invoke original layout information relating to digital report elements rendered on an original layout region, wherein the original layout information comprises coordinate values and original dimensions including height and width values of the digital report elements;
    automatically generate an optimized layout plan for rendering the digital report elements on the target layout region comprising:
        determining an order of the digital report elements, along a first coordinate axis;
        classifying the digital report elements into multiple arrays based on the original layout information and the determined order;
        deriving origin values for the digital report elements in the multiple arrays based on the original dimensions of the digital report elements, wherein the origin values are derived along at least the first coordinate axis and the second coordinate axis, wherein deriving the origin values for the digital report elements along the first coordinate axis comprises:
            traversing at least one of the multiple arrays sequentially along the first coordinate axis; and
            dividing a sum of maximum of width values of the digital report elements in the at least one of the multiple arrays that are traversed by a sum of maximum of width values of the digital report elements in the multiple arrays;
        further wherein deriving the origin values for the digital report elements, along the second coordinate axis comprises:
            traversing at least one of the digital report elements sequentially along each array of the multiple arrays; and
            dividing a sum of height values of the at least one of the digital report elements that are traversed in a corresponding array by a sum of height values of the digital report elements in the corresponding array;
        determining fractional values for scaling the original dimensions of the digital report elements in the multiple arrays based on the derived origin values, along the first coordinate axis and the second coordinate axis; and
        determining target layout values as a function of the derived origin values and the determined fractional values; and
    arranging the digital report elements on the target layout region based on the determined target layout values.

10. A display device comprising:
    a display interface;
    a memory to store a program code; and
    a processor to execute the program code to:
    invoke original layout information for digital report elements rendered on an original layout region, wherein the original layout information comprises coordinate values and original dimensions including height and width values of the digital report elements rendered on the original layout region;
    automatically generate an optimized layout plan for rendering the digital report elements on the target layout region comprising:
        determining an order of the digital report elements, along a first coordinate axis;
        classifying the digital report elements into multiple arrays based on the original layout information and the determined order;
        deriving origin values for the digital report elements in the multiple arrays based on the original dimensions of the digital report elements, wherein the origin values are derived along at least the first coordinate axis and the second coordinate axis, wherein deriving the origin values for the digital report elements along the first coordinate axis comprises:
            traversing at least one of the multiple arrays sequentially along the first coordinate axis; and
            dividing a sum of maximum of width values of the digital report elements in the at least one of the multiple arrays that is traversed by a sum of maximum of width values of the digital report elements in the multiple arrays;
        further wherein deriving the origin values for the digital report elements in each array of the multiple arrays along the second coordinate axis comprises:
            traversing at least one of the digital report elements sequentially along each array of the multiple arrays; and
            dividing a sum of height values of the at least one of the digital report elements that are traversed in a corresponding array by a sum of height values of the digital report elements in the corresponding array;
        determining fractional values for scaling the original dimensions of the digital report elements in the multiple arrays based on the derived origin values of the digital report elements, along the first coordinate axis and the second coordinate axis; and
        determining target layout values as a function of the derived origin values and the determined fractional values; and arrange the digital report elements on the target layout region based on the determined target layout values.

11. The device of claim 10, wherein the original layout region is associated with a second device communicatively coupled to the display device.

12. The device of claim 10, wherein the digital report elements include charts and images.

13. The device of claim 10, wherein the display device includes one of a communication device, a computing device, a tablet PC, a PDA, a computer, or any portable electronic device having a display.

14. A system operating in a communication network, comprising:
- a source system; and
- a computer comprising a memory to store a program code, an interface, and a processor to execute the program code to:
- receive from the source system, original layout information for digital report elements rendered on an original layout region, wherein the original layout information comprises coordinate values and original dimensions including height and width values of the digital report elements;
- automatically generate an optimized layout plan for rendering the digital report elements on the target layout region comprising:
  - determining an order of the digital report elements, along a first coordinate axis;
  - classifying the digital report elements into multiple arrays based on the original layout information and the determined order;
  - deriving origin values for the digital report elements in the multiple arrays based on the original dimensions of the digital report elements, wherein the origin values are derived along at least the first coordinate axis and the second coordinate axis, wherein deriving the origin values for the digital report elements along the first coordinate axis comprises:
    - traversing at least one of the multiple arrays sequentially along the first coordinate axis; and
    - dividing a sum of maximum of width values of the digital report elements in the at least one of the multiple arrays that are traversed by a sum of maximum of width values of the digital report elements in the multiple arrays;
  - further wherein deriving the origin values for the digital report elements in each array of the multiple arrays along the second coordinate axis comprises:
    - traversing at least one of the digital report elements sequentially along each array of the multiple arrays; and
    - dividing a sum of height values of the at least one of the digital report elements that are traversed in a corresponding array by a sum of height values of the digital report elements in the corresponding array;
  - determining fractional values for scaling the original dimensions of the digital report elements in the multiple arrays based on the derived origin values of the digital report elements, along the first coordinate axis and the second coordinate axis; and
  - determining target layout values as a function of the derived origin values and the determined fractional values; and
- arrange the digital report elements on the target layout region based on the determined target layout values.

15. The system of claim 14, wherein the system is an on-demand solution accessed over the network using a web browser.

16. The system of claim 14, wherein the original layout region is a landscape layout and the target layout region is a portrait layout.

* * * * *